Patented Aug. 13, 1929.

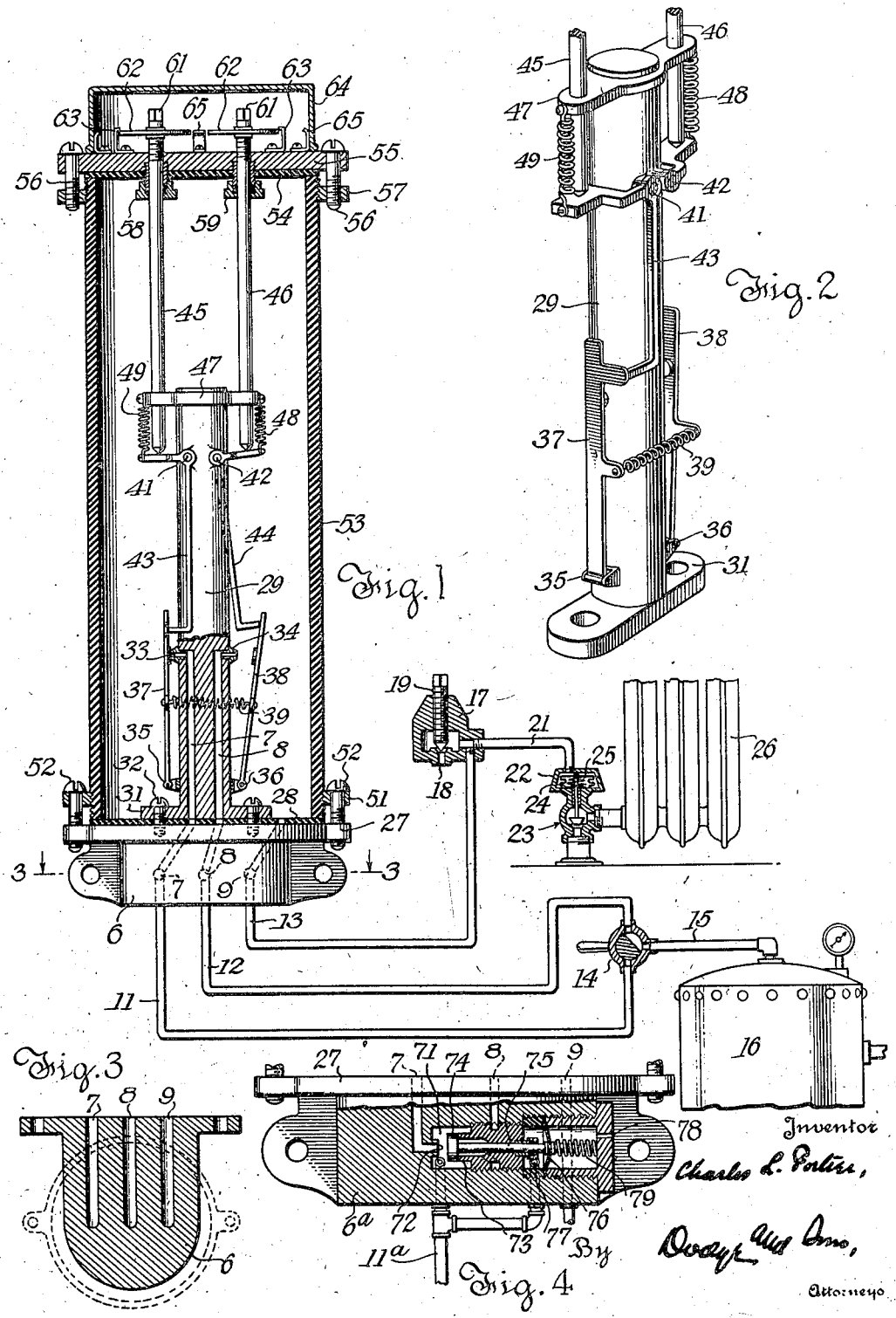

1,724,347

UNITED STATES PATENT OFFICE.

CHARLES L. FORTIER, OF MILWAUKEE, WISCONSIN, ASSIGNOR TO JOHNSON SERVICE COMPANY, OF MILWAUKEE, WISCONSIN, A CORPORATION OF WISCONSIN.

TEMPERATURE REGULATION.

Application filed March 22, 1928. Serial No. 263,761.

This invention relates to temperature regulation, and particularly to devices for maintaining one temperature during the day and another temperature at night.

The object of the invention is to cause a single thermally responsive element to operate to establish selectively either of two temperatures without requiring any adjustment of the working parts of the device.

Hitherto, so far as I am aware, the only known way of establishing two temperatures automatically by the operation of a single thermally responsive device was to change the adjustment of that device, and as the motion of the parts for ordinary ranges of temperature is extremely minute, even slight wear in the adjusting mechanism had serious deranging effects. To avoid this difficulty, recourse has been had to the use of two thermally responsive elements which were rendered effective in alternation with one another. This involves unnecessary expense, and in certain types of thermostat results in an instrument of undue bulk.

The present invention will be shown as applied to a thermostat of the pneumatic type, but the invention is not limited in its broad aspect to pneumatic actuation. Furthermore, there has been chosen for purpose of illustration what is known as an intermediate type of thermostat, i. e., one which gives progressive regulation of the heat controller. But this is not essential nor is it essential to adhere to the exact port arrangement herein described in some detail, approximately equivalent port arrangements of specifically different forms being known in the art.

Generally stated the heat controller is of the motor actuated type and according to the present invention is controlled by either of two regulating devices which selectively control the supply of motive energy to said motor. These two regulating devices are caused to function at different respective temperatures by a single thermostatic element. A selector is provided which renders the regulating mechanisms effective in alternation with each other and this selection may conveniently be performed by switching the motive energy to one or another of the regulating devices so that only that one which receives motive energy is functionally effective, the other going through its motions idly and without functional effect on the heat controller.

A preferred embodiment of the invention is illustrated in the accompanying drawings, in which,—

Fig. 1 is a vertical axial section of the thermostat with the connections to the heat controller and the connections from the motive energy supply shown in diagram.

Fig. 2 is a perspective view of a portion of the thermostatic mechanism.

Fig. 3 is a section on the line 3—3 of Fig. 1.

Fig. 4 is a fragmentary view partly in section, similar to the lower portion of Fig. 1 and showing a modification.

6 is a base provided with ports 7, 8 and 9 which register with companion ports in a pipe head mounted in the wall. This pipe head is a familiar expedient and is not shown, the connections being shown in diagram on Fig. 1 where the port 7 is connected to the pipe 11, port 8 to the pipe 12 and port 9 to the pipe 13, which are the connections that would be established by the pipe head where a pipe head is used. Pipes 11 and 12 lead to two ports of a three-way valve 14, whose third port is connected by a pipe 15 with the pressure supply tank 16. The sole purpose of the valve 14 is to connect either the pipe 11 or the pipe 12 with the tank 16, the other pipe being simultaneously cut off. The pipe 13 leads to a casing 17 which has a bleed port 18 controlled by a threaded needle valve 19. The purpose of this is to establish a minute regulable vent from the pipe 13. A branch 21 connects pipe 13 to the motor chamber 22 of a radiator valve 23.

Chamber 22 contains a metallic bellows 24 which may be forced downward by pressure arriving through the connection 21 against the resistance of spring 25 to close the radiator valve 23. The spring opens the valve in the absence of such pressure. The radiator 26 is symbolic of any heating means, and the radiator valve 23 is symbolic of any appropriate heat controller. Obviously any heating means and appropriate heat controller might be substituted without the exercise of invention.

Formed on the upper face of the member 6 is a flanged seat 27 upon which rests a gasket 28 having ports which register with the ports 7, 8 and 9. Seated on the gasket 28 is a member comprising an upright portion 29 and a seating flange 31 which is clamped against the gasket 28 by screws 32 threaded in base 6.

Formed in the member 29 are extensions of ports 7 and 8, the first of which terminates in a minute discharge nozzle 33 and the second of which terminates in a similar and oppositely located discharge nozzle 34. Pivoted at 35 and 36 on the member 29 are two valve members 37 and 38, which are drawn toward each other by a very light spring 39 reaching between the two, and which carry valve faces capable of sealing the ends of the nozzles 33 and 34.

Pivoted at 41 and 42 are bell crank levers 43 and 44, of identical form, the downward extending arms of which respectively engage extensions on the members 37 and 38. The horizontal shorter arms of the bell cranks 43 and 44 are engaged in thrust by pins 45 and 46 which extend through guides formed in the member 47 carried by the upper end of the member 29. Connected to the member 47 are springs 48 and 49 which are connected at their lower ends to respective horizontal arms of the bell cranks 43 and 44. The springs 48 and 49 are each heavier than the spring 39 so that either, if permitted to do so, will overpower the spring 39 and open the corresponding valve member 38 or 37 as the case may be.

Seated on the gasket 28 and clamped thereagainst by an encircling ring 51 and clamp screws 52 is a thermally responsive member 53 which here takes the form of a vulcanite tube. Any material having a coefficient of expansion higher than the coefficient of expansion of the members 29, 45 and 46, might be used.

Seated on the upper end of the tube 53 with an intervening gasket 54, is a cap plate 55 which is retained by screws 56 passing through the cap plate and threaded into the ring 57 which encircles the upper end of the tube 53 and is fixed thereon. The rods 45 and 46 are threaded into the plate 55 so as to be vertically adjustable relatively thereto and leakage along the threads is precluded by packing glands 58 and 59. Each of the rods 45 and 46 is squared, as indicated at 61, and each carries a corresponding graduated dial 62. These are read against pointers 63 mounted on the cap plate 55. A removable cover 64 is retained by the spring clips 65.

The rods 45 and 46 are adjusted for different temperatures, that is, they are so adjusted that as the tube 53 expands one valve member, in this case 38, opens its nozzle 34 before the other valve member 37 opens its nozzle 33. Only one of these ports is effective to admit air to the interior of the tube 53 at a time and which one is so effective is determined by the setting of the valve 14.

When pressure is admitted to the interior of the tube by the opening of either 33 or 34, pressure fluid flows through the port 9 and pipes 13 and 21 to the motor chamber 22 and closes the radiator valve. The needle valve 19 is so set that the outflow through port 18 is less than the maximum supply flow through either of the ports 33 or 34. The progressive throttling of either nozzle 33 or 34, whichever is active, acts in conjunction with port 18 to establish a varying pressure in the motor chamber 22 so that between certain temperature limits there is progressive heat regulation, tending to maintain a definite temperature.

By supplying the pressure fluid selectively to the nozzles 33 and 34, it is possible to maintain either of two desired temperatures, but in both cases the regulation is effected by an expansion and contraction of a single thermostatic unit, namely the tube 53. The temperatures maintained in the two settings are each determined and may be varied by changing the adjustment of the pins 45 and 46.

In some installations the cost of running two lines 11 and 12 from the main control station at the valve 14 might be excessive. To accomplish the same result with a single line I have devised the modified structure shown in Fig. 4. Here two ports 7 and 8 are used as before in a body 6$^a$, similar to the body 6. There is also a port 9, which as before connects with the pipe 13. Instead of two pipes 11 and 12 a single pipe 11$^a$ is used together with some means for establishing in this pipe two different pressures. For this purpose the means shown in my prior Patent 1,597,350 might be used. The pipe 11$^a$ connects with the valve chamber 71, having a seat 72 with which the port 7 communicates and a seat 73 with which the port 8 communicates. These ports are sealed in alternation with each other by a valve 74 mounted on a stem 75 and guided by a diaphragm 76. This diaphragm is subject on its left hand side to the pressure in the pipe 11$^a$ by means of a branch which communicates with the space to the left of the diaphragm 76 through a port 77. The space to the right of the diaphragm 76 is vented to atmosphere by the port 78 and the diaphragm is urged to the left by a spring 79 so chosen that it overpowers the diaphragm when the pressure is at a given low value, say ten pounds, and is overpowered by the diaphragm when the pressure is at a given high value, say fifteen pounds.

It will be obvious from a consideration of Fig. 4 that when the lower supply pressure exists pipe 11$^a$ is connected to the port 8 and when the higher supply pressure exists the pipe 11$^a$ is connected to the port 7. In this way a varying characteristic of the motive fluid, in this case pressure, is availed of to connect the supply line selectively with the ports 7 and 8, thus accomplishing with a single supply pipe the same result that is accomplished in the device of Figs. 1 to 3 inclusive by the use of the two pipes 11 and 12. The operation of the thermostat remains the same as before.

Whichever way selection is made as to the supply of pressure fluid to the pipes 7 and 8, the effect is to render one of the valve members 37 or 38 operative and the other inoperative, though, of course, that other continues to perform its characteristic movements under the control of the thermostatic member 53.

Obviously various changes in the device might be made without departing from the spirit of the invention which, broadly considered, is thermal control by a single thermostatic element at two characteristically different temperatures without requiring adjustment of the thermostatic element. This result is secured by causing the thermostatic element to operate selectively either of two regulating mechanisms having characteristically different adjustments.

Broadly considered, the invention is not limited to thermostats of the pneumatic type, nor is it limited to thermostats in which the heat controller motor is vented at a fixed rate and the thermostat controls the supply of motive fluid thereto. For example, there are other known arrangements using a fixed throttling port in conjunction with a variably throttled port under thermostatic control, and to such the invention is applicable by the use of ordinary mechanical skill.

What is claimed is,—

1. The combination of a motor actuated heat controller; two devices each connected to control independently of the other the supply of motive energy to the motor of said controller; means for rendering either of said devices operative selectively to control said motor; a single thermally responsive element; and mechanical connections between said responsive element and said devices through which said element causes said devices to function at different characteristic temperatures.

2. The combination of a motor actuated heat controller; two devices each connected to control independently of the other the supply of motive energy to the motor of said controller; means for supplying motive energy to said two devices selectively; a single thermally responsive element; and mechanical connections between said element and said devices through which said element causes said devices to function at different characteristic temperatures.

3. The combination of a motor actuated heat controller capable of being actuated by motive energy having a variable characteristic; two devices each connected to control independently of the other the supply of said motive energy to the motor of said controller; means responsive to said variable characteristic of the motive energy for rendering said devices operative selectively; a single thermally responsive element; and mechanical connections between said responsive element and said devices through which said element causes said devices to function at different characteristic temperatures.

4. The combination of a motor actuated heat controller capable of operation by motive energy having a variable characteristic; two devices each connected to control independently of the other the supply of motive energy to the motor of said controller; means responsive to a variable characteristic of said motive energy for supplying said motive energy selectively to said devices; a single thermally responsive element; and mechanical connections between said responsive element and said devices through which said element causes said devices to function at different characteristic temperatures.

5. The combination of a pressure actuated heat controller; a thermostatic element; a pair of valve devices connected to be operated by said thermostatic element at different characteristic temperatures; and connections for causing said valve devices selectively to control said heat controller.

6. The combination of a fluid pressure actuated heat controller; a thermostatic element; a pair of valve devices connected to be operated by said thermostatic element at different temperatures and each capable of controlling the supply of motive fluid to said heat controller; and connections for supplying motive fluid selectively to said devices whereby they are rendered effective to control said heat controller alternatively with each other.

7. The combination of a fluid pressure actuated heat controller; a thermostatic element; a pair of valve devices connected to be operated by said thermostatic element at different temperatures and each capable of controlling the supply of motive fluid to said heat controller; a pressure fluid supply; and means responsive to the pressure of said pressure fluid supply for connecting the same to said valve devices selectively.

8. The combination of a heat controller; a motor for actuating the same; a single thermally responsive element; controlling means actuated by said responsive element and including two controlling units effective at different temperatures; and means for placing said motor under the control of either of said units at will.

9. The combination of a heat controller; a motor for actuating the same; a single thermally responsive element; controlling means actuated by said element and having two controlling units effective at different temperatures to control the supply of motive energy to said motor; means for supplying motive energy; and means responsive to a variable characteristic of said energy for placing said motor under the control of either unit of said controlling means to the exclusion of the other.

10. The combination of a heat controller; a fluid pressure motor for actuating the same, there being a restricted vent from said motor; two valves controlling feed passages to said motor; a single thermally responsive element; operative connections between said element and said valves for opening said valves at different temperatures by the thermal response of said element; and means for supplying motive fluid to said valves selectively.

11. The combination of a heat controller; a fluid pressure motor for actuating the same, there being a restricted vent from said motor; two valves controlling feed passages to said motor; a single thermally responsive element; operative connections between said element and said valves for opening said valves at different temperatures by the thermal response of said element; means for adjusting at least one of said connections to vary the temperature at which such opening occurs; and means for supplying motive fluid to said valves selectively.

12. The combination of a heat controller; a fluid pressure motor for actuating the same, there being a restricted vent from said motor; two valves controlling feed passages to said motor; a single thermally responsive element; operative connections between said element and said valves for opening said valves at different temperatures by the thermal response of said element; means for supplying motive fluid; and means responsive to the pressure of said supply for directing said motive fluid selectively to said valves.

13. In a temperature regulating system of the dual regulating pneumatic type, the combination of heat regulating means; a pressure motor for actuating the same; two regulating ports, and a third port of less capacity than either regulating port, all associated with said motor; two valves each controlling one of said regulating ports; a single thermally responsive element associated with both said valves to open and close the same but at different temperatures for the two valves; and means for rendering said regulating ports and associated valves effective to control said motor in alternation one with the other.

14. In a temperature regulating system of the pneumatic progressively acting type, the combination of a heat regulating motor of the expansible chamber type capable of moving progressively in two directions in accordance with progressive increases and decreases of motive fluid pressure, said motor having a throttling constriction and two regulating port controlling valves, each valve of a maximum flow capacity greater than the flow capacity of the throttling constriction, whereby the variation in capacity of either valve relatively to the capacity of said constriction will produce pressure variations in said motor; a single thermally responsive element associated with both said regulating port controlling valves to open and close the same progressively, but at different temperatures for the two valves; and means for rendering said valves effective in alternation with each other.

In testimony whereof I have signed my name to this specification.

CHARLES L. FORTIER.